(12) United States Patent
Le Berre (10) Patent No.: US 12,462,059 B2
(45) Date of Patent: Nov. 4, 2025

(54) METHOD FOR MANAGING DATA ACCORDING TO ONE OR MORE PRIVACY PROTECTION RULES

(71) Applicant: 360 of Me, Inc., Detroit,, MI (US)

(72) Inventor: Philippe Miliau Georges Le Berre, Versoix (CH)

(73) Assignee: CINDY L. WARNER, Traverse City, MI (US)

( * ) Notice: Subject to any disclaimer, the term of this patent is extended or adjusted under 35 U.S.C. 154(b) by 102 days.

(21) Appl. No.: 18/413,650

(22) Filed: Jan. 16, 2024

(65) Prior Publication Data
US 2025/0232057 A1 Jul. 17, 2025

(51) Int. Cl.
G06F 21/62 (2013.01)
G06F 21/60 (2013.01)
H04L 9/30 (2006.01)

(52) U.S. Cl.
CPC ........ G06F 21/6245 (2013.01); G06F 21/602 (2013.01); H04L 9/3073 (2013.01)

(58) Field of Classification Search
CPC ... G06F 21/6245; G06F 21/602; H04L 9/3073
See application file for complete search history.

(56) References Cited

U.S. PATENT DOCUMENTS

| | | | |
|---|---|---|---|
| 9,202,078 | B2 | 12/2015 | Abuelsaad et al. |
| 9,830,476 | B2 | 11/2017 | Fontecchio |
| 9,973,455 | B1 * | 5/2018 | Fowler ................... H04L 51/046 |
| 9,998,435 | B1 | 6/2018 | Kothari |
| 10,769,305 | B2 | 9/2020 | Lowenberg et al. |
| 11,023,842 | B2 * | 6/2021 | Beaumont ............... G06F 15/76 |
| 11,036,884 | B2 | 6/2021 | Gkoulalas-Divanis |
| 11,138,337 | B2 | 10/2021 | Yousfi et al. |
| 2018/0167201 | A1 * | 6/2018 | Naqvi .................... H04L 9/3236 |
| 2018/0307859 | A1 * | 10/2018 | LaFever ................... H04L 63/20 |
| 2019/0238525 | A1 * | 8/2019 | Padmanabhan ....... H04L 63/101 |
| 2020/0186506 | A1 * | 6/2020 | Shockley .............. H04L 9/3242 |

(Continued)

FOREIGN PATENT DOCUMENTS

| | | | | | |
|---|---|---|---|---|---|
| CN | 106716914 | A | * | 5/2017 | ............ H04W 12/08 |
| CN | 109559117 | A | * | 4/2019 | ............ G06Q 40/04 |

(Continued)

OTHER PUBLICATIONS

Samson Esayas,"The Role of Anonymisation and Pseudonymisation Under the EU Data Privacy Rules", European Journal of Law and Technology, vol. 6, No. 2, 2015 , 23 Pages Posted: Mar. 13, 2016 (Year: 2015).*

(Continued)

*Primary Examiner* — Shahriar Zarrineh (57) ABSTRACT

The present document discloses a system and a method for structuring and organising data, including personally identifiable information, into a set of databases. The system and method allow for an individual to whom the data relates to be able to share parts of the data with different third parties in a privacy-respecting manner, respecting any applicable legislation related to data privacy. Third parties thus only can access parts of the data which are relevant to them and they need to seek the consent of the individual in order to have access to any private information.

14 Claims, 2 Drawing Sheets

(56) References Cited

U.S. PATENT DOCUMENTS

| | | | |
|---|---|---|---|
| 2020/0311304 A1* | 10/2020 | Parthasarathy | G06F 11/3006 |
| 2020/0327250 A1* | 10/2020 | Wang | G06N 20/00 |
| 2020/0402625 A1* | 12/2020 | Aravamudan | G06F 21/6245 |
| 2020/0403795 A1* | 12/2020 | Murdoch | H04L 9/321 |
| 2021/0026982 A1* | 1/2021 | Amarendran | G06F 21/6254 |
| 2021/0209251 A1* | 7/2021 | Parthasarathy | G06F 21/602 |
| 2022/0147645 A1* | 5/2022 | Linde | G06F 40/284 |
| 2022/0222373 A1* | 7/2022 | Villax | H04L 63/0421 |
| 2022/0321335 A1* | 10/2022 | Lum | H04L 9/0897 |
| 2023/0161900 A1* | 5/2023 | Boutros | G06F 3/0482 726/27 |
| 2023/0195933 A1* | 6/2023 | Satish Padmanabhan | G06F 40/263 726/26 |
| 2023/0299938 A9* | 9/2023 | Dai | H04L 9/50 713/160 |
| 2024/0070324 A1* | 2/2024 | Cuellar Jaramillo | G06F 21/6245 |
| 2024/0202725 A1* | 6/2024 | Anapliotis | G06Q 30/0607 |

FOREIGN PATENT DOCUMENTS

| | | | |
|---|---|---|---|
| CN | 113973508 B * | 12/2023 | H04L 9/3213 |
| JP | 7439125 B2 * | 2/2024 | G06F 21/6245 |
| WO | WO-2018201009 A1 * | 11/2018 | G06F 21/6254 |
| WO | WO-2019246568 A1 * | 12/2019 | H04L 9/3239 |
| WO | WO-2021204313 A1 * | 10/2021 | H04W 12/02 |
| WO | WO-2024069562 A1 * | 4/2024 | G16H 10/60 |
| WO | WO-2024100425 A1 * | 5/2024 | G06F 21/604 |

OTHER PUBLICATIONS

Sophie Stalla-Bourdillon and Alison Knight, "Anonymous Data V. Personal Data—A False Debate: An EE Perspective on Anonymization, Pseudonymization and Personal Data," 38 pages (Year: 2016).*

Joana Ferreira Marques, "Analysis of Data Anonymization Techniques", 1Polytechnic Institute of Coimbra, Coimbra Institute of Engineering, Rua Pedro Nunes, 3030-199 Coimbra, Portugal, (Year: 2020).*

Sérgio Luís Ribeiro, "Privacy Protection with Pseudonymization and Anonymization In a Health IoT System", Published in: 2019 IEEE 19th International Conference on Bioinformatics and Bioengineering (BIBE), Date of Conference: Oct. 28-30, 2019, 5 pages (Year: 2019).*

Shukor Abd Razak, "Data Anonymization Using Pseudonym System to Preserve Data Privacy", Published in: IEEE Access (vol. 8), pp. 43256-43264, Date of Publication: Feb. 28, 2020 , 9 pages (Year: 2020).*

Hao Jin, "A Review of Secure and Privacy-Preserving Medical Data Sharing", Published in: IEEE Access (vol. 7) pp. 61656-61669, Date of Publication: May 14, 2019 (Year: 2019).*

* cited by examiner

METHOD FOR MANAGING DATA ACCORDING TO ONE OR MORE PRIVACY PROTECTION RULES

TECHNICAL DOMAIN

The concepts described herein relate generally to the field of digital signal processing. More particularly, systems and methods described herein may be used to allow personal data related to an individual to be collected, stored and/or shared in a privacy-preserving manner.

BACKGROUND

Privacy, in the context of data processing, refers to the rights and expectations of individuals to control their personal information, regardless of the medium or format. This control encompasses not just the protection and secrecy of data, but also the ethical, transparent, and consensual collection, storage, processing, and sharing of that information. Privacy upholds the individual's autonomy and dignity by ensuring that they are the primary decision-makers when it comes to their personal data. Whereas security mechanisms (like passwords, authentication, or firewalls) protect data from unauthorized access or malicious threats, they do not necessarily guarantee the responsible use, collection, or sharing of personal data. It is possible to have a very secure system that still mishandles personal information. Encryption is a known security mechanism for keeping data secret by making it unreadable to unauthorized parties. However, just because data is kept secret does not guarantee that it will only be used in a way that respects an individual's privacy rights. For example, a company could encrypt a massive amount of personal data they collected without permission and then use it in ways that an individual to whom the data related would not approve.

In the realm of privacy preservation, the industry has had to deal with newer challenges and attacks leading to a continuously evolving array of solutions for countering such attacks. On one hand, traditional encryption was relied on to ensure privacy through secrecy. However, merely hiding the data does not fully address privacy concerns, as the data must still be shared and then decrypted for use. Known solutions to this problem include the use of Fully Homomorphic Encryption (FHE), a breakthrough approach that allows for computational operations, such as comparisons, to be performed on encrypted data without requiring that the data be decrypted. This not only enhances the preservation of secrecy but also represents a significant advancement in privacy technology.

Other known techniques, two of which are described in the European Union general data protection regulation (GDPR), include pseudonymization and anonymization. Pseudonymization is the processing of personal data in such a manner that the personal data can no longer be attributed to a specific data subject without the use of additional information, provided that such additional information is kept separately and is subject to technical and organizational measures to ensure that the personal data is not attributed to an identified or identifiable natural person. Anonymization ensures that re-identification of a specific data subject, even by the entity who anonymized the data, is impossible. In general terms, a data subject can be considered to be "identified" when, within a group of persons, he or she is "distinguished" from all other members of the group. The principle of data minimization dictates that the collection, storage, and processing of personal data be limited to the minimum extent necessary for fulfilling a specific purpose. Under this principal, organizations should only gather, retain, and use data that is directly relevant and essential to accomplish a particular objective, and should avoid holding data that is not directly relevant or necessary for that purpose.

Building on the advancement in hashing algorithms and associated mathematics, "Data Tokenization" techniques have been devised. Data Tokenization involves the partial or total replacement of specific private data by a token, offering a unique advantage in that unlike encrypted data, tokenized data cannot be decoded to its original form, thus ensuring unparalleled secrecy.

Known data tokenization techniques include: Random Tokenization (RT), where sensitive data is replaced by randomly generated token, thus ensuring anonymity; Format-Preserving Fingerprint Tokenization (FT), in which unique and irreversible hash values (fingerprints) are created from sensitive data, serving as tokens; Format-Preserving Encryption (FPE), in which encryption is applied to sensitive data while preserving its original format; tokenization with a Master Token (MT), where sensitive data is replaced by tokens, and a master token or key is used to manage them; Dynamic Data Masking (DDM), where sensitive data is masked in real-time to authorised users, protecting it from unauthorized access; Token Swapping/Shuffling (TS), where tokens of similar characteristics are swapped randomly between data records for enhanced privacy; Cryptographic Tokenization (CT), in which encryption algorithms are used to replace sensitive data with tokens that can be decrypted with authorized keys; Partial Tokenization (PT), in which only a portion of sensitive data is replaced with tokens, while the rest remains in its original form; Token Buckets (TB), where multiple records with similar characteristics are grouped, and a single token is assigned to the entire group.

However, the battle for privacy is not without its challenges. Weaknesses in encryption and hash algorithms have been found and attackers can ultimately attempt actions like brute-force attacks on the encrypted data. In contrast to encryption however, with tokens, an attacker must breach a database to access the table, or vault, containing the token-to-data correspondence, should it exist. As such, tokenization may present certain advantages over encryption.

Yet, secrecy alone is insufficient to guarantee full privacy. This was dramatically demonstrated in 2014 by Aaron Roth and Cynthia Dwork with the introduction of the "Fundamental Law of Information Recovery", which posits that "overly accurate answers to too many questions will destroy privacy in a spectacular way", thus paving the way to so-called reconstruction attacks. This revelation showed that more work was needed to counter such attacks, leading to the development of Differential Privacy, a set of methods that introduces noise and/or randomness into a dataset, while conserving the advantage that the data is still able to be processed or otherwise analyzed.

Differential privacy is a state-of-the-art definition of privacy used when analyzing large data sets. It guarantees that adversaries cannot discover an individual within the protected data set by comparing the data with other data sets.

Differential privacy in relation to data analysis can be informally defined using a before-and-after approach. That is, the analyst should not know more about any individual after analyzing data. Further, any adversary should not have too different a view of any individual after having access to a database.

In a more technical definition, differential privacy provides privacy by process. Specifically, the process introduces randomness into a data set. The process must achieve this without altering the possibility of being able to perform analyses on the data. Present and future sources of auxiliary information (such as other data sets) must not compromise an individual's privacy.

A reconstruction attack is any method for partially reconstructing a private dataset from public aggregate information. Typically, the dataset contains sensitive information about individuals, whose privacy needs to be protected. The attacker has no access or only partial access to the dataset but has access to public aggregated statistics about the datasets, which could be exact or distorted, for example by adding noise. If the public statistics are not sufficiently distorted, the attacker may be able to accurately reconstruct a large portion of the original private data.

U.S. Pat. No. 9,830,476B2 outlines a process involving cascading encryption and token generation from data elements identifying an individual. This process, facilitated through a series of encryption keys, enables multiple systems to relate, in de-identified fashion, to the same individual in their respective databases, post transmission, and to re-encrypt the data at a data processing system. This method ensures the generation of de-identified records, which can be linked to other data records for the individual, enhancing data usability while maintaining privacy. Whilst it provides a clever way for multiple parties to communicate, it does not present a solution for organizing the various data elements in a secure manner based on their sensitivity, immutability and relevancy towards each party.

None of the known techniques provide for in-depth protection of privacy, notably when personally identifiable information (PII) must still be communicated in a privacy preserving way to a third party in order for the person to whom the personally identifiable information is related to enjoy the delivery of an online service for example, while allowing the person to preserve their privacy or to give their consent as to who gets access to which data and for which purpose. Furthermore, none of the known techniques are based on building-in privacy, even implicitly, at the data structure level.

Consequently, there remains a need for a system or a method for allowing individuals to provide their consent as to who can do what with which parts of their private data and for which purposes. Such a system would allow the individual to be able to select and control, at different levels of detail or abstraction, the amount and type of personal data that different parties in different jurisdictions would be able to use or access. This would mean that data storage could be offered to individuals and service providers with more certainty of complying with privacy preservation criteria according to the different jurisdictions which may be implied in the storage and/or use of the data.

BRIEF SUMMARY

Personally Identifiable Information (PII), if it falls into the hands of an unscrupulous third party, may allow that third party to impersonate an individual with whom the personally identifiable information is associated, thus allowing the third party, for instance, to defraud the individual, especially in the context of online transactions. Exchanging or otherwise sharing personally identifiable information online exposes such information to possible interception by unscrupulous third parties. On the other hand, an individual may desire to have access to an online service provided by a provider of goods or services, where the individual must share information about themselves or about individuals or property associated with them online, including private data such as personally identifiable information or any data that the individual would like to keep private, in order for the individual to be able to access the goods or services being proposed.

Embodiments described herein provide for a system and for a process which allow for personal information to be organized based on its confidentiality, immutability and relevance, for example, thus enabling individuals to selectively share different sets of information from a data set which may include personally identifiable information, in a way which allows one or more service providers to process, analyze, or otherwise use the different sets of information to which they have been consented access while still ensuring that the private information, or personally identifiable information, remains private. This is achieved through structuring and organizing information, including private information and personally identifiable information, or any information that an individual would like to keep secret, into a set of interrelated databases. A high level of privacy is thus maintained while allowing for business objectives to be achieved using the information, thereby allowing for the monetizing of the information. An individual can therefore allow for designated parts of their information to be used by one or more designated service providers in return for meaningful services, where the service provider gets to use the designated parts of the information without the individual losing control of the privacy of their information, some of which they may want to keep secret.

In the context of the present disclosure, reference is made to external data from a data source device. The data source device may be an electronic computing device, comprising one or more processors and memory and preferably having communication capability, for example for communicating with a server via the Internet. The data source device may be related to or associated with an individual, usually a physical person, in the sense that the data source holds or has access to information related to the individual. The data source device may be owned by the individual or it may be owned by a third party. An example of such a data source device could be an onboard computer in a rental car, which can generate and/or hold telemetry data related to an individual who rented the car and/or to one or more other people related to the individual, at least temporarily, for example a person riding in the same car as the individual or a relative of the individual or a person for whom the individual is legally responsible. The telemetry data may describe where the individual has been with the car or where the other person related to the individual has been with the car. The telemetry data may thus be indirectly related to another individual, travelling with or otherwise related to the first individual. The data source may otherwise be a computer or server where the data related to the individual is stored. The data generated by the data source, or held at the data source, is referred to as external data. Embodiments described herein provide for privacy-respecting ways of handling and/or storing the external data and for allowing the individual to provide their consent over who can access which elements of the external data, especially if it meant that personally identifiable information and/or private data could be discovered, and what the external data may be used for. Since the external data is related to or otherwise linked to or associated with an individual, in the context of the present disclosure, the individual is generally referred to as the data subject.

The data source device may store the external data in a privacy preserving manner in a set of interrelated databases as described herein and/or it may transmit the external data for storage, in the privacy preserving manner, at a server. One or more third parties may request to have access to parts of the external data. In the context of the present disclosure, a third party such as this is referred to as a data processing entity, meaning a computing device of the third party or used by the third party. The third party may be a physical person having a nationality and a residence, which may be significant according to applicable legislation governing data privacy.

The scheme described herein ensures that access to the private data is strictly limited in normal business operations, and that combinations of privacy-preserving techniques can be properly distributed and combined at various levels of abstraction. It also ensures that all interactions with a precise third party on a specific data domain are limited to one unique restricted identifier, which can be revoked without compromising the business capabilities of the entire system.

According to a first aspect, there is disclosed herein a computer-implemented method for managing data by a data storage provider at a data storage center according to one or more territory-specific privacy protection rules, said data being related to a data subject and comprising private data and external data, said private data including personally identifiable information comprising one or more private attributes, the data subject being an identifiable natural person, the privacy protection rule depending on a nationality or residence of the data subject and/or a geographical location of a data source device in which at least part of said external data is generated or stored and/or a nationality or residence of the data storage provider or geographical location of the data storage center and/or a nationality or residence of an identifiable data processing entity with which said external data may be shared, said data subject having a unique, fixed, private identifier. The method includes encrypting said private attributes under a secret key, the secret key being a private key of a private and public key pair according to a public-key cryptography algorithm, to form a private data record, identifiable by said private identifier, related to said data subject; generating one or more protected data sets from the private data record, each protected data set corresponding to a scoped data domain, the scoped data domain being defined by a typology of the managed data and a geographical scope related to where the external data was generated or will be generated, each protected data set having a unique protected identifier derived from the private identifier and being identifiable by a corresponding protected key derived from the secret key pair, the protected key being a private key of a private and public key pair according to a public-key cryptography algorithm, said generating of one or more protected data sets comprising, for each scoped data domain:
  grouping a set of protected attributes into a protected data structure associated with the corresponding protected data set, said protected attributes comprising tokenized versions of the private attributes used to form the corresponding private data record; and encrypting the protected attributes under the protected key;
the method further comprising, depending on one or more predetermined combinations of protected attributes present in the external data to be managed:
  generating one restricted identifier per combination, each restricted identifier being based on:
    the protected identifier of the scoped data domain to which the managed external data from the data source device belongs; and/or
    one or more protected attribute identifiers of one or more protected attributes in the protected data structure in the scoped data domain to which the managed external data from the data source device belongs;
  each restricted identifier being uniquely identifiable by a corresponding restricted key derived from the protected key pair of the protected identifier of the scoped data domain to which the managed external data from the data source device belongs, the restricted key being a private key of a private and public key pair according to a public-key cryptography algorithm; and
ingesting the external data from the data source device and replacing the protected attributes by their corresponding restricted identifiers, said ingested data thus being shareable with the data processing entity according to the privacy protection rules.

According to an embodiment, any type of de-identification technique may be used instead of the tokenization technique mentioned above. For example, pseudonymization techniques may be used.

According to another aspect, provision is made for a non-transitory machine-readable medium having stored thereon machine-readable instructions executable to cause a machine to perform operations to allow a data storage provider at a data storage center to manage data according to one or more territory-specific privacy protection rules, said data being related to a data subject and comprising private data and external data, said private data including personally identifiable information comprising one or more private attributes, the data subject being an identifiable natural person, the privacy protection rule depending on a nationality or residence of the data subject and/or a geographical location of a data source device in which at least part of said external data is generated or stored and/or a nationality or residence of the data storage provider or geographical location of the data storage center and/or a nationality or residence of an identifiable data processing entity with which said external data may be shared, said data subject having a unique, fixed private identifier, said managing comprising:
  encrypting said private attributes under a secret key, the secret key being a private key of a private and public key pair according to a public-key cryptography algorithm, to form a private data record, identifiable by said private identifier, related to said data subject;
  generating one or more protected data sets from the private data record, each protected data set corresponding to a scoped data domain, the scoped data domain being defined by a typology of the managed data and a geographical scope related to where the external data was generated or will be generated, each protected data set having a unique protected identifier derived from the private identifier and being identifiable by a corresponding protected key derived from the secret key pair, the protected key being a private key of a private and public key pair according to a public-key cryptography algorithm, said generating of one or more protected data sets comprising, for each scoped data domain:
    grouping a set of protected attributes into a protected data structure associated with the corresponding protected data set, said protected attributes comprising tokenized versions of the private attributes used to form the corresponding private data record; and
    encrypting the protected attributes under the protected key;

the method further comprising, depending on one or more predetermined combinations of protected attributes present in the external data to be managed:

generating one restricted identifier per combination, each restricted identifier being based on:

the protected identifier of the scoped data domain to which the managed external data from the data source device belongs; and/or one or more protected attribute identifiers of one or more protected attributes in the protected data structure in the scoped data domain to which the managed external data from the data source device belongs;

each restricted identifier being uniquely identifiable by a corresponding restricted key derived from the protected key pair of the protected identifier of the scoped data domain to which the managed external data from the data source device belongs, the restricted key being a private key of a private and public key pair according to a public-key cryptography algorithm; and ingesting the external data from the data source device and replacing the protected attributes by their corresponding restricted identifiers, said ingested data thus being shareable with the data processing entity according to the privacy protection rules.

According to still another aspect, there is provided a computer system for managing external data from at least one data source device for conditional access by at least one identifiable data processing entity, comprising one or more computer processors, one or more computer readable storage media, and the non-transitory machine-readable medium as described above.

BRIEF DESCRIPTION OF THE DRAWINGS

The concepts described herein will be better understood thanks to the detailed description which follows, along with the accompanying drawings, in which the following is shown.

DETAILED DESCRIPTION

Embodiments described herein provide for privacy preserving techniques which allow users to protect the privacy of their personally identifiable information (PII), especially where such information needs to be shared with, and handled by, a service provider. Such privacy preserving techniques allow for the service provider to use consumer generated data in data-driven systems to provide marketing knowledge, for example, while protecting the users' privacy.

Figure 1A:
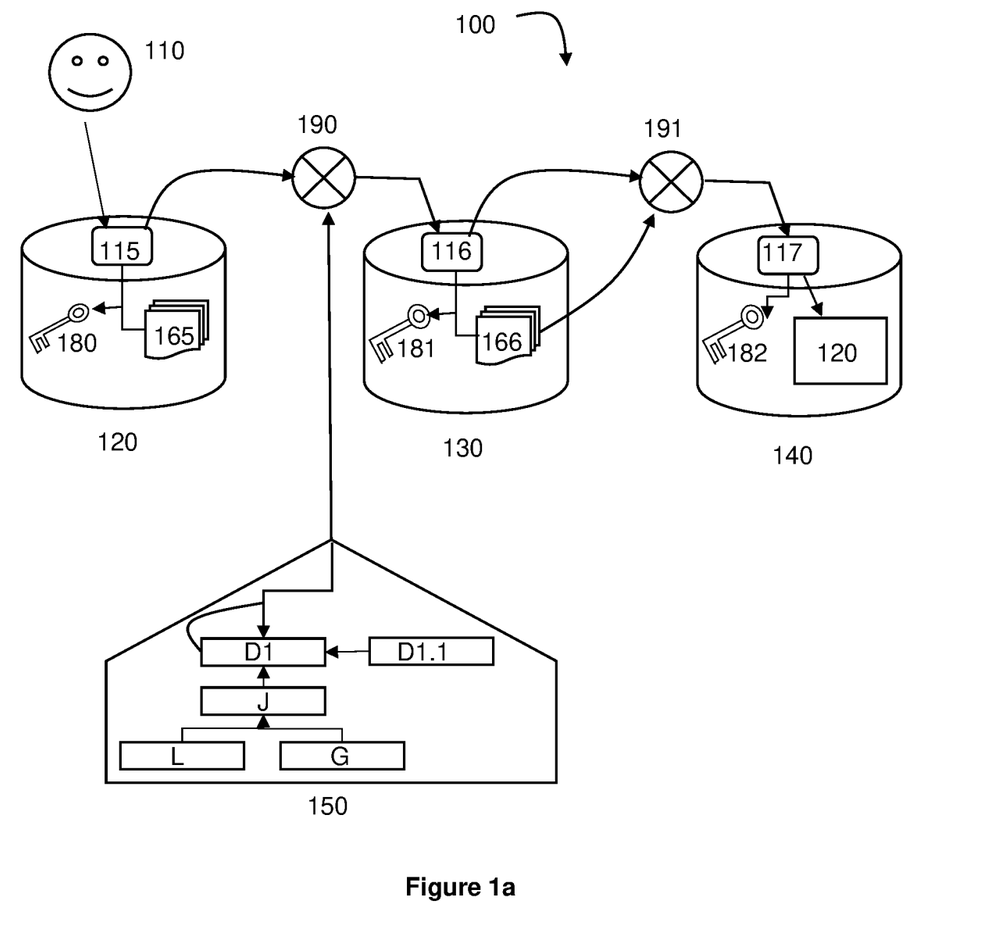
FIG. 1a, on which a set of inter-related databases according to embodiments described herein is illustrated.
Figure 1B:
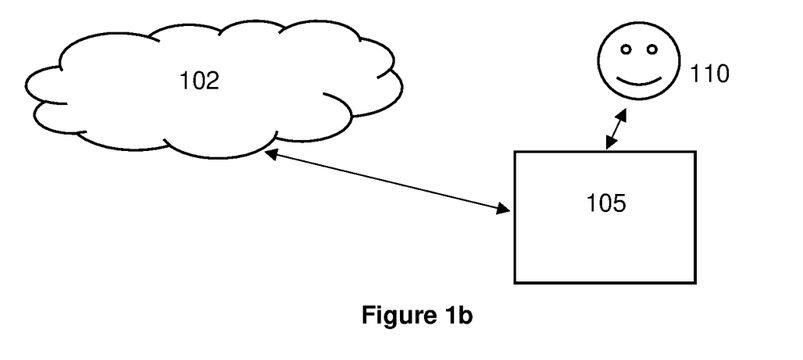
FIG. 1b, illustrating a system within which an embodiment described herein may be deployed.

FIG. 1 illustrates a plurality of inter-related databases 120, 130, 140, which may be used, as described herein, to allow a data storage provider 102 to collect and/or store data related to a data subject 110 from a data source device 105, the data source device being used to generate or otherwise register data related to the data subject, in a privacy-preserving manner. The data subject 110 may choose to share data which has been gathered by, or is otherwise stored in, the data source device 105, or at a data storage center, with a third party for processing in a privacy-preserving manner. Embodiments described herein therefore allow for data related to an individual, including private data and personally identifiable information, to be structured and organised in the set of inter-related databases, allowing for a high level of privacy to be maintained while also allowing for business objectives to be achieved, notably the monetization of the data.

According to an embodiment, a limited core set of personally identifiable information to be grouped into an organized private data record 120, or private database, to which a first private and public key pair may be assigned, this first key pair being known as the secret key pair 180. Included in this limited core set of information could be information which would allow for the individual with whom the information is related to be uniquely identified without undue effort. This is among the most immutable personally identifiable information, having values which are highly unlikely to change over time. This includes things like first name, last name, place of birth, social security number or national insurance number and so on. These are private attributes 165 related to the individual. In the private database, the private attributes are related to a private identifier 115, which is a unique, fixed identifier attributed to the individual 110. The private data record therefore contains private attributes associated with a private identifier. The data in the private data record define a particular person as being a unique individual. According to an embodiment, the private attributes in the private data record may be encrypted under the secret key, i.e. the private key of the secret key pair.

According to an embodiment, the private identifier is generated and attributed to an individual only after going through a process of strong authentication at the time of registration. Suitable authentication process include those known as Know Your Customer techniques (KYC), which allow to ensure that a person is who they claim to be. Such techniques, for example, may require that an individual provide their passport or identity card when they register. Then, when an individual wants to identify himself or herself to the system, an image of their face may be captured and processed to check whether the image matches the photo on their passport or identity card.

Embodiments described herein allow for individuals to manage their privacy, giving their consent for certain third parties to access certain parts of their data for certain purposes, thus allowing them to share their data in a privacy-preserving manner. Wherever personally identifiable information has to be shared, it is information derived from the PII which is shared, so that the third party can still use the information without the actual PII having been shared.

Other sensitive or private data, which is not designated as being part of the core set of personally identifiable information, may be grouped as records of a separate organized data structure and encrypted using the secret key.

According to an embodiment, one or more protected data sets are derived from the private data record. Each of the protected data sets is uniquely associated with a scoped data domain. The data domain with which a protected data set is associated depends on the typology of the data in the protected data set. By scoped data domain, it is meant that as well as the typology of the associated data, the data domain takes account of the notion of a geographical scope applicable to the data.

A scoped data domain is therefore a semantic space which allows for personal data from various sources which are under the same set of regulations or constraints to be consolidated. Scoped data domains provide for a typology of vaults which also have geographical scope. For example, a scoped data domain may refer to a region, a country, a state or a province. Examples of typology of scoped data domains include health, finance, telemetry, transport, etc. By "scoped" it means that that as well as the typology, the data in a scoped data domain pertains in some way to a particular geographical region. A scoped data domain could cover, for example, healthcare in the USA or financial activities in the European Union, France. Scoped data domains allow for the grouping and processing of data in compliance with different applicable regulations, which usually depend on different legislations applicable according to different jurisdictions.

Each protected data set is identifiable by a private and public key pair, known as the protected key, derived from the private data set's key pair, the secret key. Each scoped data domain has a protected identifier. The protected identifier uniquely identifies a particular scoped data domain. A scoped data domain may have another scoped data domain as its parent. Otherwise, a scoped data domain may be set as a root data domain, in which case it can only have "children" and not parents. Scoped data domains are immutable.

The protected identifier is derived from the private identifier and so the protected identifier relates both to the scoped data domain and the unique individual, or data subject, identified by the private identifier. The protected key may be derived from the secret key using a key derivation function, as illustrated in FIG. 1, Where the key derivation function is represented by reference 190.

Advantageously, the fact that a scoped data domain takes account of a geographical scope, the organization described herein allows for compliance regulations and/or laws applicable with regard to ensuring the privacy of personal data can be taken into consideration, as they vary depending on geographical implications. In fact, compliance regulations may vary depending on which jurisdiction applies and so generally depend on a geographical location of where the data was generated or where it will be used or stored or depending on the nationality or residency of the data subject, etc. In the context of the present disclosure, such aspects can be satisfied by associating the data with a scoped data domain. The scoped data domain comprises protected data records associated with a protected identifier. Different data domains cover different scopes or compliance perimeters, depending on the typology of the data to be referenced in the data domain. The scope may also depend on a notion of jurisdiction, which may include a geographical scope and a legal scope. The protected identifier may be derived from the private identifier using a derivation function which also takes the data domain into account. This way, each data domain has its own protected identifier. FIG. 1 illustrates how the derivation function 190 uses the private identifier 115 to derive the protected identifier 116 and is steered by a combination of: typology information D1.1, D1 about the attributes to be stored in the data domain (possibly hierarchical typology); and jurisdiction information J relative to privacy protection rules, which may in turn depend on a given legal scope L and a geographical scope G so that many different protected identifiers may result. This jurisdiction information takes account of which privacy protection rules are applicable to which data and the geographic scope, including where the data originates from, where it will be used or stored, the nationality or residence of the data source and so on. This allows for different protected attributes to be stored and associated with different data domains, by their protected identifiers.

A set of protected attributes is grouped into an organized data structure which is associated with a protected identifier. The protected attributes may include tokenized versions of corresponding private attributes in the respective private data record. In some cases, a protected attribute may have no corresponding private attribute, the protected attribute being locally generated for a particular scoped data domain. Such attributes, having no corresponding private attribute, may hold information which needs to be temporarily linked to an individual. For example, in a scoped data domain relative to healthcare in France, an individual's security number may be stored as a protected attribute which is a tokenized version of the social security number of a corresponding individual in the private database. In a scoped data domain relative to mobility in the UK, information about car rental may be stored. The vehicle identification number (VIN) may therefore have no corresponding attribute in the private database and a tokenized version of the vehicle identification number may be locally generated as a protected attribute in the scoped data domain relative to mobility in the UK.

Figure 2:
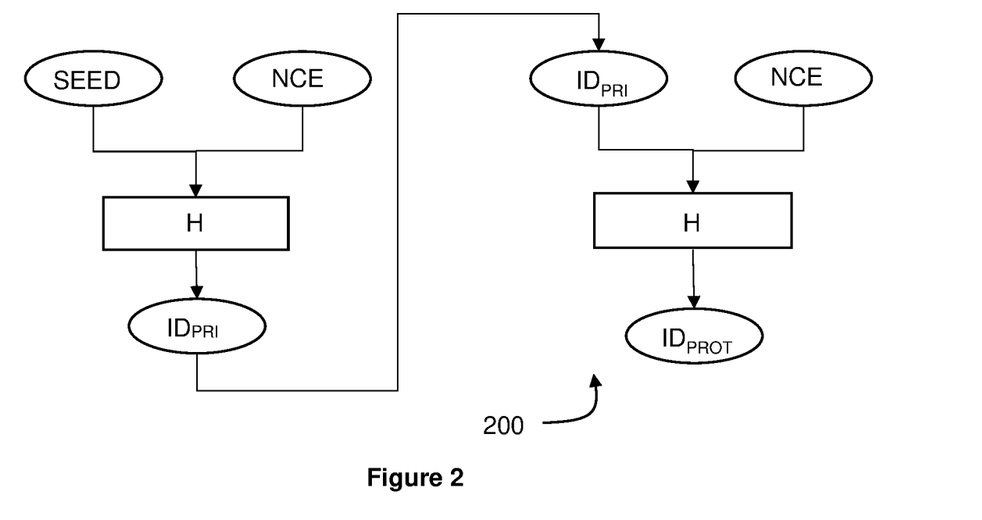
FIG. 2, illustrating a method for generating private identifiers and protected identifiers as described herein.

FIG. 2 illustrates how private identifiers and protected identifiers may be derived. A combination of a seed and a nonce may be hashed to produce a unique, random or pseudo-random private identifier. Information, or attributes, directly linked to a private identifier allow for the unique identification of an individual, a human person, including for example their first name, last name, maiden name, sex at birth, place of birth, country of birth, and/or nationality at birth. According to some embodiments, a private identifier may be designated as being a custodian of another private identifier, specifying the custodial relationship, such as parent/child, etc. Thus, relationships between private identifiers can be set up. A private identifier may have zero or more private attributes, which are specific instances of private attribute types. Private attributes can be related to zero or more protected identifiers.

As mentioned above, FIG. 2 also illustrates how protected identifiers are generated according to an embodiment. A protected identifier may be derived from a one-way function, such as a hash, of a combination of a private identifier and a nonce.

Figure 3:
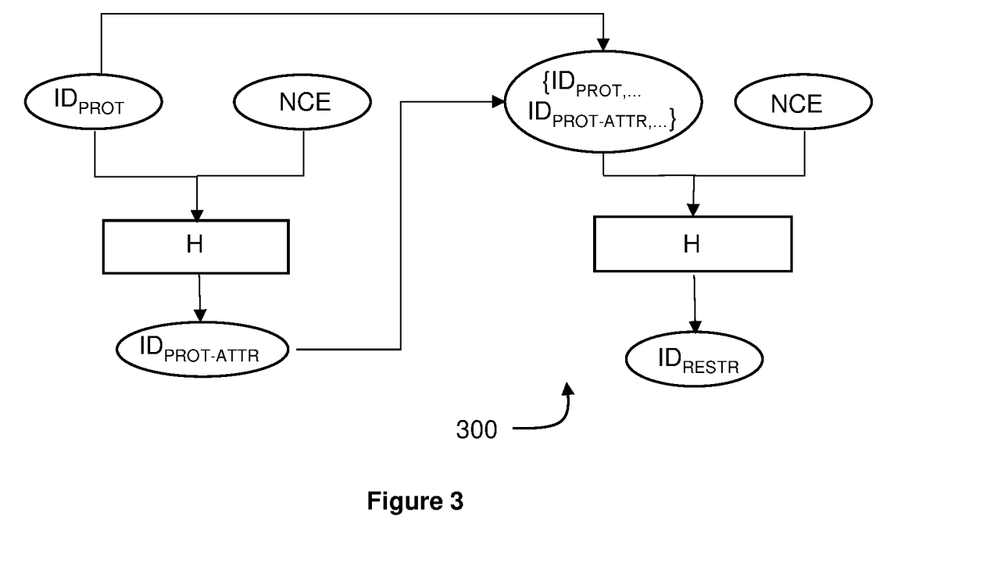
FIG. 3, illustrating a method for generating a restricted identifier as described herein.

Based on business needs, e.g. of various different third parties, or data processing entities, a number of corresponding different restricted identifiers may be derived from a protected identifier of a given scoped data domain in the so-called "protected zone" and one or more protected attribute identifiers from the scoped data domain. Each restricted identifier is uniquely identified by a private and public key pair, a restricted key, derived from the key pairs of the contributing scoped data domain in the protected zone and/or tokens of the protected attributes. Each restricted identifier is uniquely associated with a specific data source device or a specific data processing entity to isolate within a data domain the exchange of information with a specific third party. According to an embodiment, the external data may be encrypted under the restricted key.

FIG. 3 illustrates how restricted identifiers may be derived.

The schema described above ensures that access to the private data is strictly limited in normal business operations, and that combinations of privacy-preserving techniques can be properly distributed and combined at various levels. It also ensures that all interactions with a precise third party on a specific data domain are limited to one unique restricted identifier, which can be revoked without compromising the business capabilities of the entire system.

For example, an individual rents a car and wants to make data concerning the car rental available for a third party to use, e.g. telemetry information collected by a computer in the car during the time that the car is rented. In this case, the computer in the car is the data source device, the individual is the data subject and the third party is the data processing entity. The user's personally identifiable information is stored in a private database as private attributes associated with the user's private identifier. A protected identifier is generated from the private identifier, the protected identifier being associated with a data domain which may be known as ("Telemetry", "USA"). A private attribute which is a tokenized version of the individual's name may be stored as a protected attribute in the protected database relative to the ("Telemetry", "USA") domain associated with the protected identifier. A further, locally created, protected attribute in the form of a tokenized version of the rented car's VIN may be added to the data domain. A restricted identifier may then be created, linked to the protected identifier and its protected attribute identifier VIN. This restricted identifier may then be used to link with all of the ingested data records from the car. The VIN will be replaced by the attribute's token in the data. The same individual may then rent another car and the same process would follow for the other car but using a new restricted identifier generated for the other car because it has a different VIN. The new restricted identifier will be linked to the same protected identifier however because the data domain is still the same as before. The individual then moves to Europe and rents another car. This time a new protected identifier will be generated for a new data domain ("Telemetry", "EU") with a new protected identifier, where the jurisdiction is GDPR. The VIN of the new rental car in Europe will be a protected attribute associated with the new protected identifier. A new restricted identifier may be issued to identify data ingested from the rental car in Europe, the new restricted identifier being generated from the new protected identifier and the new protected attribute for the European rental car's VIN. Should the individual then rent another car in Europe, then a new restricted identifier would apply for tracking data ingested from the new rental car in Europe since it has a different VIN. This way, all of the telemetry data are ingested and identified so that they can be properly split per jurisdiction and per source and may be coalesced as needed.

By way of another example, Alice buys a new car and records the new car's VIN as a private attribute associated with her private identifier. A protected identifier may then be created, for a data domain covering telemetry in the USA, for example, and a tokenized version of the VIN may be stored in that data domain as a protected attribute associated with the protected identifier. A restricted identifier may then be created, linked to the combination of the protected identifier and the protected attribute for the VIN and used to track data collected from the car. The next day, Bob, who is Alice's son, takes Alice's car. Alice has also specified that Bob is a minor in her custody and so this fact is known by the system. A new protected identifier may be created for Bob for the data domain relative to telemetry in the USA and another protected attribute added for the VIN of Alice's car (not linked to Alice's private attribute). A restricted identifier may then be created for the combination of the protected identifier, the protected attribute identifier, and Alice's private attribute identifier for the VIN. This is because it is Alice's car and it is her son who is using it. The telemetry data is then linked to this restricted identifier. Using a combination of identifiers for the restricted identifiers helps to be able to bind and share data between relevant parties.

Different restricted identifiers can therefore be bound or otherwise linked to a data source and therefore to the external data from the data source, meaning that different restricted identifiers can be used to link to a particular combination of protected identifier (and therefore a particular scoped data domain) and attribute identifier or identifiers and so used to identify ingested data. Restricted identifiers, derived from protected identifiers are used to track ingested data from data sources associated with specific scoped data domains: so, scoped data domains to which data sources pertain must match the scoped data domain of the related protected identifier.

Restricted identifiers may be time-limited in that they may have an expiry date after which they would have to be renewed. Restricted identifiers may be expressly revoked. A restricted identifier may involve a combination of a number of different people. For example, if there were five people in a rented car, then the restricted identifier could take account of all five people.

Embodiments described herein allow for data to be exported in a privacy-preserving way. Protected identifiers are generated to combine relevant information from different scoped data domains and the relevant protected attributes are shared, not the personally identifiable information. In this way, compliance issues by dealt with by design.

According to an embodiment, asymmetric cryptographic keys may be used to sign the data in order to be able to verify whether the data is legitimate. For example, the private attributes may be signed by the secret key, the protected attributes may be signed by a protected key which may be derived from the secret key using a key derivation function, and the data at the data source may be signed by a restricted key, which may be derived from the protected key using a key derivation function.

The invention claimed is:

1. A computer-implemented method for managing data by a data storage provider at a data storage center according to one or more territory-specific privacy protection rules, said data related to a data subject and comprising private data and external data, said private data including personally identifiable information comprising one or more private attributes, the data subject is an identifiable natural person, the privacy protection rule depending on a nationality or residence of the data subject and/or a geographical location of a data source device in which at least part of said external data is generated or stored and/or a nationality or residence of the data storage provider or geographical location of the data storage center and/or a nationality or residence of an identifiable data processing entity with which said external data may be shared, said data subject having a unique, fixed, private identifier, said method comprising:

encrypting said private attributes under a secret key, the secret key is a private key of a private and public key pair according to a public-key cryptography algorithm, to form a private data record, identifiable by said private identifier, related to said data subject;

generating one or more protected data sets from the private data record, each protected data set corresponding to a scoped data domain, the scoped data domain is defined by a typology of the managed data and a geographical scope related to where the external data was generated or will be generated, each protected data set having a unique protected identifier derived from the private identifier and identifiable by a corresponding protected key derived from the secret key pair, the protected key is a private key of a private and public key pair according to a public-key cryptography algorithm, said generating of one or more protected data sets comprising, for each scoped data domain:

grouping a set of protected attributes into a protected data structure associated with the corresponding protected data set, said protected attributes comprising tokenized versions of the private attributes used to form the corresponding private data record; and
encrypting the protected attributes under the protected key;
the method further comprising, depending on one or more predetermined combinations of protected attributes present in the external data to be managed:
generating one restricted identifier per combination, each restricted identifier is based on:
the protected identifier of the scoped data domain to which the managed external data from the data source device belongs; and/or
one or more protected attribute identifiers of one or more protected attributes in the protected data structure in the scoped data domain to which the managed external data from the data source device belongs;
each restricted identifier is uniquely identifiable by a corresponding restricted key derived from the protected key pair of the protected identifier of the scoped data domain to which the managed external data from the data source device belongs, the restricted key is a private key of a private and public key pair according to a public-key cryptography algorithm; and
ingesting the external data from the data source device and replacing the protected attributes by their corresponding restricted identifiers, said ingested data thus shareable with the data processing entity according to the privacy protection rules.

2. The method according to claim 1, wherein at least one of said protected attributes is at least temporarily related to the data subject and is specific to the corresponding protected data structure in that it has no corresponding private attribute.

3. The method according to claim 2, wherein said privacy protection rule depends on a consent from the data subject for the identifiable data processing entity to access all or part of the data.

4. The method according to claim 1, wherein the protected key is derived for a particular scoped data domain from the secret key using a key derivation function.

5. The method according to claim 1, wherein the ingested external data is encrypted under the restricted key, said restricted key derived from the protected key and/or one or more relevant protected attribute identifiers using a key derivation function.

6. The method according to claim 1, wherein the private identifier is derived, by one or more processors of the data storage center, from a combination of at least a random or pseudo-random string uniquely attributed to the data subject on one hand and a nonce on the other hand.

7. The method according to claim 1, wherein the protected identifier is a unique identifier derived, by one or more processors of the data storage center, from a combination of at least the corresponding private identifier on one hand and a nonce on the other hand.

8. The method according to claim 1, wherein the protected attribute identifier is a unique identifier derived, by one or more processors of the data storage center, from a combination of at least the private identifier and a nonce.

9. The method according to claim 7, wherein the combination involves forming a digest.

10. The method according to claim 9, wherein the digest is produced using a one-way cryptographic function.

11. The method according to claim 10, wherein the one-way cryptographic function is a cryptographic hash function.

12. The method according to claim 1, wherein said data subject has been formally verified as who they claim to be.

13. A non-transitory machine-readable medium having stored thereon machine-readable instructions executable to cause a machine to perform operations to allow a data storage provider at a data storage center to manage data according to one or more territory-specific privacy protection rules, said data related to a data subject and comprising private data and external data, said private data including personally identifiable information comprising one or more private attributes, the data subject is an identifiable natural person, the privacy protection rule depending on a nationality or residence of the data subject and/or a geographical location of a data source device in which at least part of said external data is generated or stored and/or a nationality or residence of the data storage provider or geographical location of the data storage center and/or a nationality or residence of an identifiable data processing entity with which said external data may be shared, said data subject having a unique, fixed, private identifier, said managing comprising:
encrypting said private attributes under a secret key, the secret key is a private key of a private and public key pair according to a public-key cryptography algorithm, to form a private data record, identifiable by said private identifier, related to said data subject;
generating one or more protected data sets from the private data record, each protected data set corresponding to a scoped data domain, the scoped data domain defined by a typology of the managed data and a geographical scope related to where the external data was generated or will be generated, each protected data set having a unique protected identifier derived from the private identifier and is identifiable by a corresponding protected key derived from the secret key pair, the protected key is a private key of a private and public key pair according to a public-key cryptography algorithm, said generating of one or more protected data sets comprising, for each scoped data domain:
grouping a set of protected attributes into a protected data structure associated with the corresponding protected data set, said protected attributes comprising tokenized versions of the private attributes used to form the corresponding private data record; and
encrypting the protected attributes under the protected key;
the method further comprising, depending on one or more predetermined combinations of protected attributes present in the external data to be managed:
generating one restricted identifier per combination, each restricted identifier based on:
the protected identifier of the scoped data domain to which the managed external data from the data source device belongs; and/or
one or more protected attribute identifiers of one or more protected attributes in the protected data structure in the scoped data domain to which the managed external data from the data source device belongs;
each restricted identifier uniquely identifiable by a corresponding restricted key derived from the protected key pair of the protected identifier of the scoped data domain to which the managed external data from the data source device belongs, the restricted key is a private key of a private and public key pair according to a public-key cryptography algorithm; and ingesting the external data from the data source device and replacing the protected attributes by their corresponding restricted identifiers, said ingested data thus shareable with the data processing entity according to the privacy protection rules.

14. A computer system for managing external data from at least one data source device for conditional access by at least one identifiable data processing entity, comprising one or more computer processors, and the non-transitory machine-readable medium according to claim 13.

* * * * *